(No Model.)
G. CRAIG.
PROCESS OF PURIFYING AMMONIUM NITRATE.
No. 573,964. Patented Dec. 29, 1896.
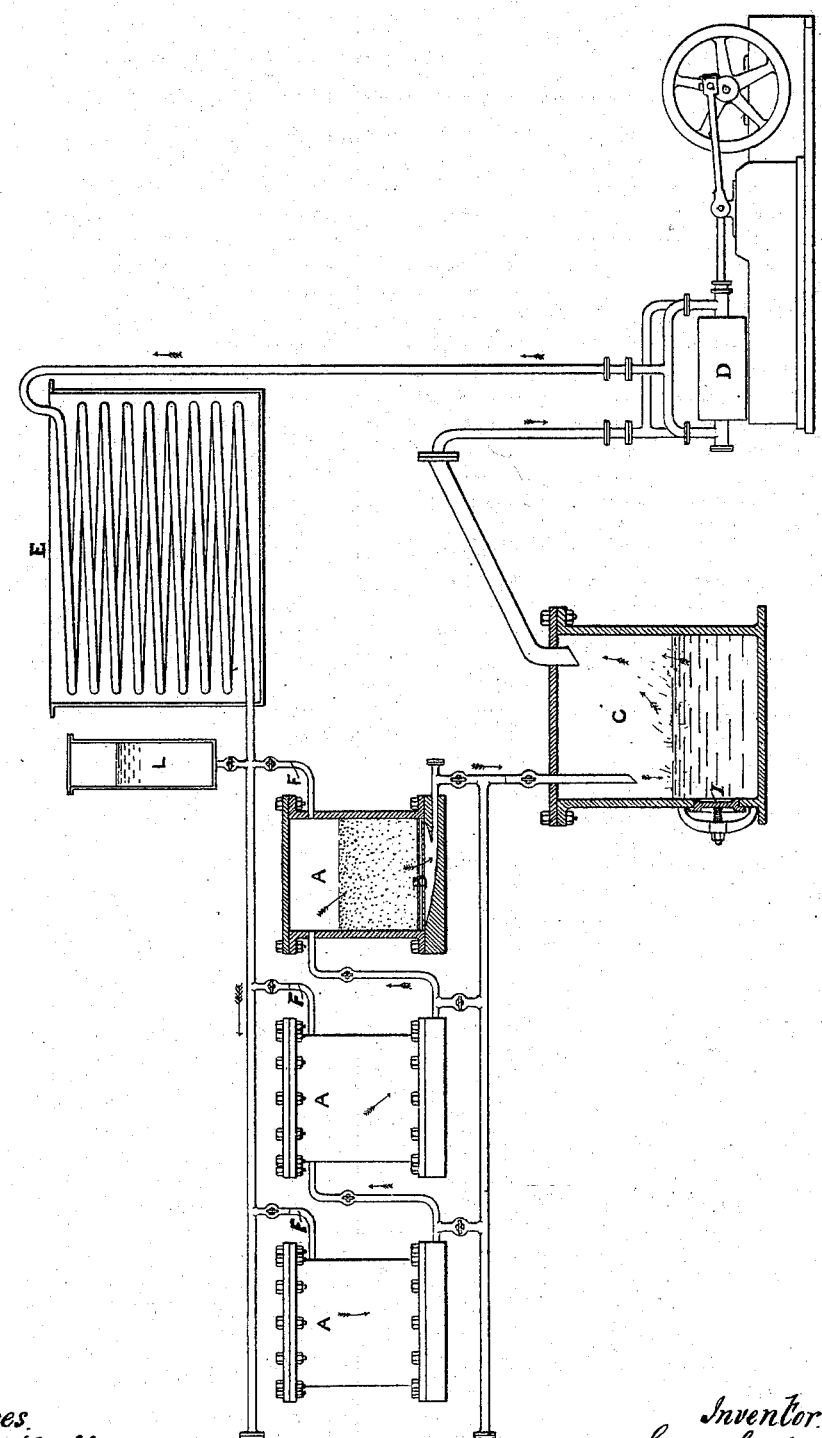

UNITED STATES PATENT OFFICE.

GEORGE CRAIG, OF GLASGOW, SCOTLAND.

PROCESS OF PURIFYING AMMONIUM NITRATE.

SPECIFICATION forming part of Letters Patent No. 573,964, dated December 29, 1896.

Application filed March 30, 1896. Serial No. 585,459. (No specimens.)

*To all whom it may concern:*

Be it known that I, GEORGE CRAIG, a subject of the Queen of Great Britain, residing at Glasgow, in the county of Lanark, Scotland, have invented certain Improvements in the Manufacture of Nitrate of Ammonium; and I do hereby declare that the following is a full, clear, and exact description of the invention, which will enable others skilled in the art to which it appertains to make and use the same.

My invention relates to a new or improved treatment for the extraction or purification of nitrate of ammonium from mixtures containing it which have been derived from former operations.

In order to more fully understand the invention, I append the accompanying drawing, which is a partly sectional elevation illustrating apparatus whereby the invention may be carried into effect.

In carrying out my invention I heat mixtures containing nitrate of potash, nitrate of soda, or both, with sulfate of ammonia in sufficient excess and with sufficient water to insure thorough double decomposition. The resulting mixture is dried, (but not necessarily until anhydrous,) and the hot pasty mass is kept agitated or stirred while cooling, when it forms a loose powder.

According to my invention the cold powder is treated with anhydrous or high-strength ammonia, which dissolves the nitrate of ammonium and leaves the mixed sulfates of potash, soda, and ammonia insoluble. The use of such high-strength ammonia, exerting, if anhydrous, from eight to ten atmospheres of pressure, necessitates the employment of strong vessels. If a weaker ammonia be used, the pressure requiring to be provided for is much less. Thus with liquid of .800 specific gravity about two atmospheres will be exerted; but a more or less impure nitrate of ammonium is produced.

The operation I prefer to carry out, preferably in series, and generally as follows: An extraction vessel or vessels A of suitable material and strength, and containing or combined with a suitable filter appliance B, is charged with the aforesaid mixture or powder and treated by digestion or percolation with ammonia of aforesaid strengths or quality. Ammonia may be conveniently introduced from a vessel L, leading to pipe F. The resulting solution is allowed to run off through the filter into a filtrate vessel or compartment C. By means of a pump D in suction connection with the atmosphere of this filtrate vessel the volatile ammonia is removed, compressed, and liquefied by suitable ordinary means, such as pump D and condenser E, and returned to the extraction vessel to dissolve a further quantity of nitrate of ammonium. This cycle of operations is continued until the extraction is as complete as desired and the ammonia recovered from the moist residue in vessel A by the aid of suction and heat if necessary. The nitrate of ammonium remaining in the filtrate vessel may be recovered as desired by removing the volatile ammonia is the same way, leaving the nitrate as a white mass in bottom of said vessel C, from which it may be removed by manhole I. When the exhausted mixture is removed from the extractor, fresh powder is introduced and the operation recommenced, or it may be performed continuously in series by using two or more extraction vessels A, as indicated by arrows. When the weaker strengths of ammonia are employed, a more or less impure nitrate of ammonium results. It contains sulfates of potash, soda, or ammonia, according to the mixtures employed, and may be separated therefrom by fractional precipitation, double decomposition, by treatment with stronger ammonia, or other suitable means. An aqueous solution of nitrate of ammonium is obtained in this case, from which the salt may be recovered by evaporation. By suitably regulating the condenser of the ammonia-generator employed such weaker ammonia may be obtained as desired.

What I claim as my invention, and desire to secure by Letters Patent, is—

1. The extraction of nitrate of ammonium from mixtures containing it, by percolating or digesting the same with anhydrous or high-strength ammonia to dissolve out the nitrate of ammonium, and obtaining it in the solid state therefrom, by evaporating off the solvent substantially as set forth.

2. Purifying impure nitrate of ammonium by combining therewith high-strength ammonia, and recovering it in the solid state by evaporation, substantially as set forth.

GEORGE CRAIG. [L. S.]

Witnesses:
DAVID F. MASON,
JOHN HALL.